(12) United States Patent
Moromisato et al.

(10) Patent No.: US 8,364,759 B2
(45) Date of Patent: Jan. 29, 2013

(54) MESH-MANAGING DATA ACROSS A DISTRIBUTED SET OF DEVICES

(75) Inventors: George P. Moromisato, Seattle, WA (US); Noah B. Edelstein, Medina, WA (US); Abhay V. Parasnis, Sammamish, WA (US); Anthony D. Andrews, Sammamish, WA (US); Raymond E. Ozzie, Seattle, WA (US); William D. Devlin, Sammamish, WA (US); Akash J. Sagar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/910,757

(22) Filed: Oct. 22, 2010

(65) Prior Publication Data

US 2011/0040850 A1 Feb. 17, 2011

Related U.S. Application Data

(63) Continuation of application No. 11/744,777, filed on May 4, 2007, now Pat. No. 7,853,669.

(51) Int. Cl.
*G06F 15/16* (2006.01)
*G06F 9/44* (2006.01)
(52) U.S. Cl. ......... 709/204; 709/203; 709/217; 719/331
(58) Field of Classification Search .................. 709/203, 709/204, 217; 719/331
See application file for complete search history.

(56) References Cited

U.S. PATENT DOCUMENTS

| | | | |
|---|---|---|---|
| 5,437,025 A | 7/1995 | Bale | |
| 5,548,726 A | 8/1996 | Pettus | |
| 5,930,156 A | 7/1999 | Kennedy | |
| 6,105,062 A | 8/2000 | Andrews | |
| 6,137,493 A | 10/2000 | Kamimura | |
| 6,209,029 B1 | 3/2001 | Epstein et al. | |
| 6,374,252 B1 | 4/2002 | Althoff | |
| 6,546,554 B1 | 4/2003 | Schmidt et al. | |
| 6,573,907 B1 * | 6/2003 | Madrane | 715/719 |
| 6,594,664 B1 | 7/2003 | Estrada | |

(Continued)

FOREIGN PATENT DOCUMENTS

| | | |
|---|---|---|
| CN | 1599901 | 3/2005 |
| JP | 2002/229902 | 8/2002 |

(Continued)

OTHER PUBLICATIONS

International Search Report for PCT/US2008/062191 mailed Oct. 21, 2008. 10 Pages.

(Continued)

*Primary Examiner* — David Lazaro
*Assistant Examiner* — Vitali Korobov
(74) *Attorney, Agent, or Firm* — L. Alan Collins; Collins & Collins Intellectual, LLC

(57) ABSTRACT

Data files, applications and/or corresponding user interfaces may be accessed at a device that collaborates in a mesh. The mesh may include any number or type of devices that collaborate in a network. Data, applications and/or corresponding user interfaces may be stored within a core object that may be shared over the mesh. Information in the core object may be identified with a corresponding user such that a user may use any collaborating device in the mesh to access the information. In one example, the information is stored remotely from a device used to access the information. A remote source may store the desired information or may determine the storage location of the desired information in the mesh and may further provide the desired information to a corresponding user.

17 Claims, 10 Drawing Sheets

U.S. PATENT DOCUMENTS

| | | | |
|---|---|---|---|
| 6,662,192 B1 | 12/2003 | Rebane | |
| 6,678,724 B2 | 1/2004 | Nakajima | |
| 6,685,090 B2 | 2/2004 | Nishigaya | |
| 6,732,172 B1 | 5/2004 | House et al. | |
| 6,907,451 B1* | 6/2005 | Mukundan et al. | 709/204 |
| 6,941,306 B2 | 9/2005 | Kim | |
| 6,952,714 B2* | 10/2005 | Peart | 709/203 |
| 6,968,535 B2 | 11/2005 | Stelting et al. | |
| 7,013,340 B1 | 3/2006 | Burd | |
| 7,054,927 B2 | 5/2006 | Ulrich et al. | |
| 7,088,995 B2 | 8/2006 | Rao | |
| 7,089,295 B2 | 8/2006 | Christfort et al. | |
| 7,099,888 B2 | 8/2006 | Gollapudi | |
| 7,117,243 B2* | 10/2006 | Peart | 709/203 |
| 7,146,524 B2 | 12/2006 | Patel et al. | |
| 7,149,959 B1* | 12/2006 | Jones et al. | 715/234 |
| 7,203,485 B2 | 4/2007 | Coppinger et al. | |
| 7,240,327 B2 | 7/2007 | Singh et al. | |
| 7,266,370 B2 | 9/2007 | Paddon et al. | |
| 7,266,563 B2 | 9/2007 | Morris et al. | |
| 7,284,196 B2 | 10/2007 | Skeen et al. | |
| 7,330,872 B2* | 2/2008 | Peart et al. | 709/203 |
| 7,406,542 B2* | 7/2008 | Erlingsson | 709/246 |
| 7,483,978 B2 | 1/2009 | Esfahany | |
| 7,577,681 B1 | 8/2009 | Rozenman | |
| 7,836,458 B1 | 11/2010 | Gwozdz | |
| 2001/0044801 A1 | 11/2001 | Senn et al. | |
| 2002/0040368 A1 | 4/2002 | Schreiber | |
| 2002/0103811 A1 | 8/2002 | Fankhauser et al. | |
| 2002/0133669 A1 | 9/2002 | Devireddy | |
| 2002/0138617 A1 | 9/2002 | Christfort | |
| 2003/0004746 A1 | 1/2003 | Kheirolomoom et al. | |
| 2003/0033308 A1 | 2/2003 | Patel et al. | |
| 2003/0063134 A1 | 4/2003 | Lord | |
| 2003/0074393 A1* | 4/2003 | Peart | 709/203 |
| 2003/0177121 A1 | 9/2003 | Moona et al. | |
| 2003/0233376 A1 | 12/2003 | Bussler et al. | |
| 2004/0103071 A1 | 5/2004 | Kalia et al. | |
| 2004/0111515 A1 | 6/2004 | Manion et al. | |
| 2004/0133589 A1 | 7/2004 | Kiessig et al. | |
| 2004/0148525 A1 | 7/2004 | Aida et al. | |
| 2004/0153568 A1 | 8/2004 | Ho | |
| 2004/0201604 A1 | 10/2004 | Kraenzel et al. | |
| 2004/0236801 A1 | 11/2004 | Borden et al. | |
| 2005/0004978 A1 | 1/2005 | Reed | |
| 2005/0021847 A1 | 1/2005 | Rothman et al. | |
| 2005/0060315 A1 | 3/2005 | Sanin | |
| 2005/0060581 A1* | 3/2005 | Chebolu et al. | 713/201 |
| 2005/0091575 A1 | 4/2005 | Relyea | |
| 2005/0102678 A1 | 5/2005 | Hunt | |
| 2005/0125771 A1 | 6/2005 | Vitanov et al. | |
| 2005/0138156 A1 | 6/2005 | Gebhart et al. | |
| 2005/0177600 A1 | 8/2005 | Eilam et al. | |
| 2005/0192962 A1 | 9/2005 | Furrer et al. | |
| 2005/0203931 A1 | 9/2005 | Pingree et al. | |
| 2005/0251786 A1 | 11/2005 | Citron et al. | |
| 2005/0251812 A1 | 11/2005 | Hayward | |
| 2005/0289454 A1 | 12/2005 | Donelson et al. | |
| 2006/0015538 A1 | 1/2006 | LeTourneau | |
| 2006/0015936 A1 | 1/2006 | Illowsky | |
| 2006/0036602 A1 | 2/2006 | Unangst et al. | |
| 2006/0037007 A1 | 2/2006 | Snyder et al. | |
| 2006/0080353 A1 | 4/2006 | Miloushev et al. | |
| 2006/0117073 A1 | 6/2006 | Bosworth et al. | |
| 2006/0123010 A1 | 6/2006 | Landry et al. | |
| 2006/0129972 A1 | 6/2006 | Tyburski et al. | |
| 2006/0143435 A1 | 6/2006 | Kwon | |
| 2006/0143601 A1 | 6/2006 | Concha et al. | |
| 2006/0206533 A1 | 9/2006 | MacLaurin et al. | |
| 2007/0005613 A1 | 1/2007 | Singh et al. | |
| 2007/0028175 A1 | 2/2007 | Moore | |
| 2007/0038642 A1 | 2/2007 | Durgin | |
| 2007/0061349 A1 | 3/2007 | Morgan et al. | |
| 2007/0073770 A1 | 3/2007 | Morris et al. | |
| 2007/0100834 A1 | 5/2007 | Landry et al. | |
| 2007/0106650 A1 | 5/2007 | Moore | |
| 2007/0150480 A1 | 6/2007 | Hwang | |
| 2007/0180043 A1 | 8/2007 | Vernal et al. | |
| 2007/0209066 A1 | 9/2007 | Timmerman | |
| 2007/0266136 A1 | 11/2007 | Esfahany | |
| 2007/0294366 A1 | 12/2007 | Ozzie et al. | |
| 2009/0240698 A1 | 9/2009 | Shukla | |
| 2009/0240935 A1 | 9/2009 | Shukla | |

FOREIGN PATENT DOCUMENTS

| | | |
|---|---|---|
| WO | WO 2005/072114 | 8/2005 |
| WO | WO 2007/083299 | 7/2007 |

OTHER PUBLICATIONS

Sollins, "Linking in a Global Information Architecture", pp. 1-18, http://www.ana.lcs.mit.edu/people/sollins/links.html, retrieved Feb. 8, 2008.

Synchronizing Data between WinFS Stores, httpa://blogs.msdn.com/winfs/archive/2006/01/25/517674.aspx, retrieved Feb. 6, 2008.

VAAS, "Microsoft Aims to Mesh Disparate Calendars, Contacts", Dated: Nov. 21, 2005.

VERISIGN, "VeriSign Unified Authentication Service", Copyright 2005.

Zhao, "Grid Metadata Catalog Service-Based OGC Web Registry Service", Proc 12th ACM International Workshop on Geographic Information Systems, Nov. 12-13, 2004.

Valavanis, "MobiShare: Sharing Context-Dependent Data & Services from Mobile Sources", Proc IEEE/WIC International Conference on Web Intelligence, 2003.

Hoschek, "Grid Enabled Relational Database Middleware", Informational document, Global Grid Forum, Frascati, Italy, Oct. 7-10, 2001.

Nathan, "Covert XML to JSON in PHP", dated Jan. 16, 2007 pp. 1-10.

"Mapping Between JSON and XML", http://msdn.microsoft.com/en-us/library/bb924435.aspx, retrieved Feb. 6, 2008.

Mukhi, "Multi-Protocol Web Services for Enterprises and the Grid", Proc. of EuroWeb 2002 Conf: The Web and the Grid: From e-science to e-business, Oxford, UK, Dec. 2002.

Gribble, "The Ninja Architecture for Robust Internet-Scale Systems and Services", Computer Networks: The Int. Journal of Computer and Telecommunications Networking, Mar. 2001.

Han, "WebSplitter: A Unified XML Framework for Multi-Device Collaborative Web Browsing", Proc 2000 ACM Conf Computer Supported Cooperative Work, 2000.

Chen, "Providing Web Services to Mobile Users: the Architecture Design of an M-Service Portal", International Journal of Mobile Communications, 2005.

Bickmore, "Digestor: Device-independent Access to the World Wide Web", Computer Networks and ISDN Systems, vol. 29, Issue 8-13, Sep. 1997.

Amazon Simple Storage Service (Amazon S3), http://www.amazon.com/gp/browse,html?node=16427261, retrieved Oct. 9, 2007.

Foley, "Can Microsoft's 'Harmonica' CreateP2P Harmony Across All Devices?" Dated: Dec. 18, 2006, pp. 1-2, http://blogs.zdnet.com/microsoft/?p=157.

"Google Data APIs Overview", http://code.google.com/apis/gdata/overview.html, retrieved Oct. 9, 2007.

Hejtmanek, "Distributed Data Storage Based on Web Access and IBP Intrastructure", The 3rd IFIP-TC6 Networking Conference, May 14, 2004.

Miller, "PCI Express and Advanced Switching: Data Movement Protocols", COTS Journal, Dated Oct. 2003, pp. 76-79.

U.S. Appl. No. 12/052,534, filed Mar. 20, 2008, Shukla.

U.S. Appl. No. 12/052,550, filed Mar. 20, 2008, Amiga et al.

U.S. Appl. No. 12/052,554, filed Mar. 20, 2008, Shukla et al.

AU Examiner's First Report, Ref. 30857693/DBW or Application No. 2008247683, Mar. 12, 2012.

PCT Search Report for Application No. PCT/US2009/034601, Aug. 24, 2009.

PCT Search Report for Application No. PCT/US2009/034442, Sep. 30, 2009.

PCT Search Report for Application No. PCT/US2009/035602, Oct. 1, 2009.

* cited by examiner

MESH-MANAGING DATA ACROSS A DISTRIBUTED SET OF DEVICES

CROSS-REFERENCE TO RELATED APPLICATION

This application is a continuation of, and claims benefit of, U.S. patent application Ser. No. 11/744,777, filed on May 4, 2007, which is incorporated herein by reference in its entirety.

BACKGROUND

Computers are often used to access data. Typically, a computer includes a memory in which data is stored. The stored data may include files containing relevant information, application programs to run the files, settings, etc. Problems arise when a user wishes to access any or all of the information on one computer while working on a second computer. When the user moves to the second computer, data available on the first computer is often unavailable on the second computer.

A user may copy a data file to a portable storage device (or a web site) and physically transport the portable storage device and the copy of the data file from the first computer to the second computer. However, additional information or data may be missing on the second computer such that the user would still be unable to fully access the data file on the second computer. For example, the application program needed to run the data file may be installed only on the first computer. In this case, the user would be unable to open or otherwise access the data file on the second computer, which lacks the needed application program. Moreover, various additional issues, such as licensing issues or privacy issues, would preclude merely copying certain other types of data to the second computer.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, a core object as described herein including relevant data or information is stored at a location that is remote from a collaborating device such as a computing device. The core object may include data files, applications corresponding to the data files, and user interfaces corresponding to the data files or applications. The core object information may be controlled or owned by a user rather than by a device associated with the user. Hence, in one example, a user may access or launch data files or applications on any device even if the device does not store, control or own the desired information.

In one example, a mesh is provided that contains any number or type of collaborating devices. The mesh may further include a remote storage location in which metadata, applications, or any relevant data or information may be stored and accessed by any of the collaborating devices in the mesh. Data and applications may be projected in a core object to any of the collaborating devices based on user identify. For example, the core object may be owned by a user such that the data is identified with the user. If the core object is stored remotely from the user's device, the location of the data may be determined in the mesh and the desired data may be projected to the user's device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Systems described herein are provided as examples and not limitations. As those skilled in the art will appreciate, the present examples are suitable for application in a variety of different types of computing systems.

Figure 1:
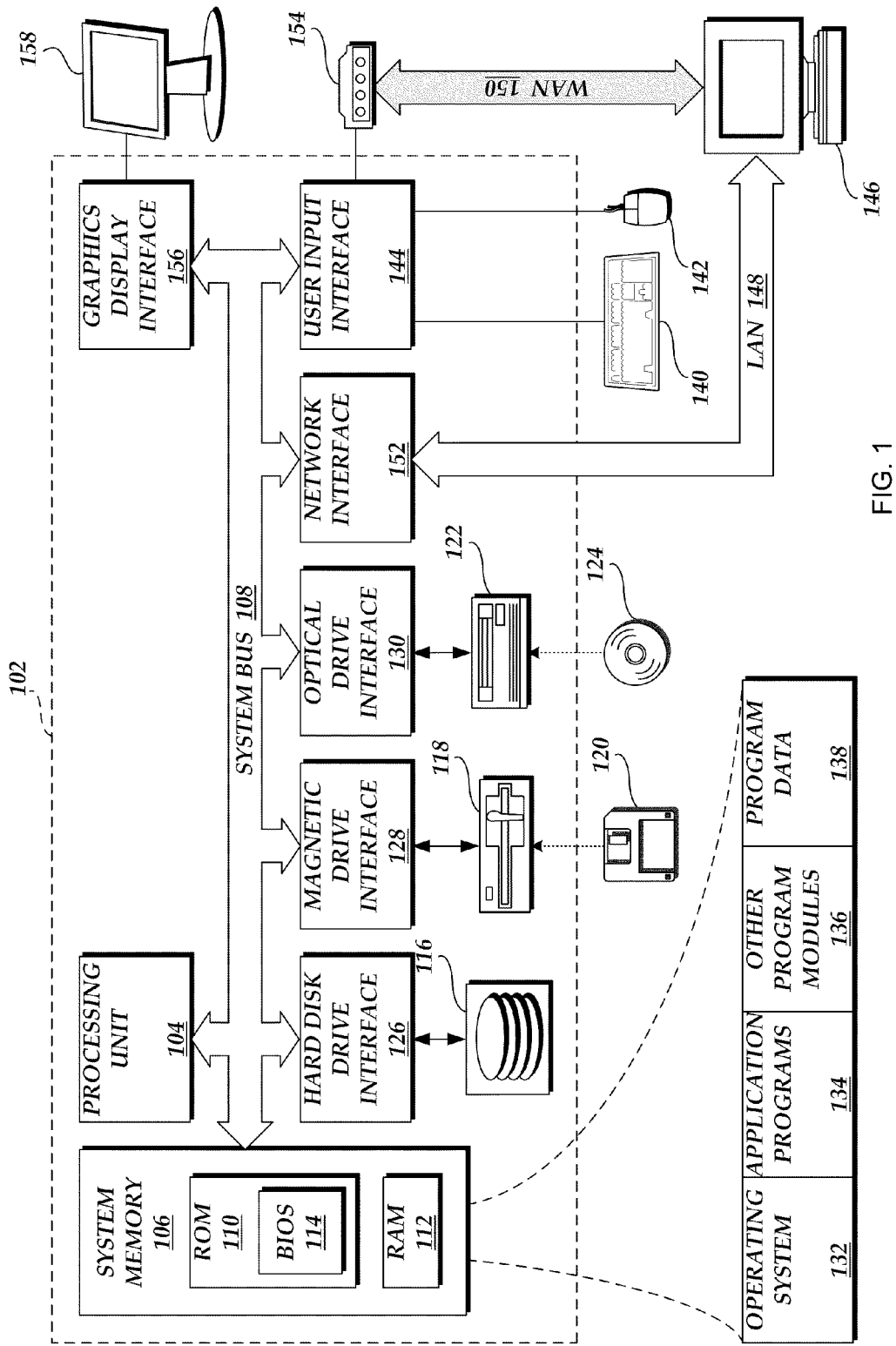
FIG. 1 illustrates an example of a suitable computing system environment in which data or other relevant information may be provided.

FIG. 1 illustrates an example of a suitable computing system environment or architecture in which computing subsystems may provide processing functionality. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The method or system disclosed herein is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The method or system may be described in the general context of computer-executable instructions, such as program modules, being executed by a computer. Generally, program modules include routines, programs, objects, components, data structures, etc. that perform particular tasks or implement particular abstract data types. The method or system may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the method or system includes a general purpose computing device in the form of a computer 102. Components of computer 102 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 102. Combinations of the any of the above should also be included within the scope of computer readable storage media.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 102, such as during start-up, is typically stored in ROM 110. RAM 112 typically contains data and/or program modules that are immediately accessible to and/or presently being operated on by processing unit 104. By way of example, and not limitation, FIG. 1 illustrates operating system 132, application programs 134, other program modules 136, and program data 138.

The computer 102 may also include other removable/non-removable, volatile/nonvolatile computer storage media. By way of example only, FIG. 1 illustrates a hard disk drive 116 that reads from or writes to non-removable, nonvolatile magnetic media, a magnetic disk drive 118 that reads from or writes to a removable, nonvolatile magnetic disk 120, and an optical disk drive 122 that reads from or writes to a removable, nonvolatile optical disk 124 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 116 is typically connected to the system bus 108 through a non-removable memory interface such as interface 126, and magnetic disk drive 118 and optical disk drive 122 are typically connected to the system bus 108 by a removable memory interface, such as interface 128 or 130.

The drives and their associated computer storage media discussed above and illustrated in FIG. 1, provide storage of computer readable instructions, data structures, program modules and other data for the computer 102. In FIG. 1, for example, hard disk drive 116 is illustrated as storing operating system 132, application programs 134, other program modules 136, and program data 138. Note that these components can either be the same as or different from additional operating systems, application programs, other program modules, and program data, for example, different copies of any of the elements. A user may enter commands and information into the computer 102 through input devices such as a keyboard 140 and pointing device 142, commonly referred to as a mouse, trackball or touch pad. Other input devices (not shown) may include a microphone, joystick, game pad, pen, scanner, or the like. These and other input devices are often connected to the processing unit 104 through a user input interface 144 that is coupled to the system bus, but may be connected by other interface and bus structures, such as a parallel port, game port or a universal serial bus (USB). A monitor 158 or other type of display device is also connected to the system bus 108 via an interface, such as a video interface or graphics display interface 156. In addition to the monitor 158, computers may also include other peripheral output devices such as speakers (not shown) and printer (not shown), which may be connected through an output peripheral interface (not shown).

The computer 102 may operate in a networked environment using logical connections to one or more remote computers, such as a remote computer. The remote computer may be a personal computer, a server, a router, a network PC, a peer device or other common network node, and typically includes many or all of the elements described above relative to the computer 102. The logical connections depicted in FIG. 1 include a local area network (LAN) 148 and a wide area network (WAN) 150, but may also include other networks. Such networking environments are commonplace in offices, enterprise-wide computer networks, intranets and the Internet.

When used in a LAN networking environment, the computer 102 is connected to the LAN 148 through a network interface or adapter 152. When used in a WAN networking environment, the computer 102 typically includes a modem 154 or other means for establishing communications over the WAN 150, such as the Internet. The modem 154, which may be internal or external, may be connected to the system bus 108 via the user input interface 144, or other appropriate mechanism. In a networked environment, program modules depicted relative to the computer 102, or portions thereof, may be stored in the remote memory storage device. By way of example, and not limitation, remote application programs may reside on a memory device. It will be appreciated that the network connections shown are exemplary and other means of establishing a communications link between the computers may be used.

A system and method is described for providing a mesh in which data files, applications, user interfaces, and other relevant information of a user may be accessed or provided at any number or type of devices. A mesh may include a storage location and/or a substrate or core object that brings together any number or any type of devices in a network. The substrate or core object of the mesh may include relevant information such as data files, applications corresponding to the data files, and/or user interfaces. The core object may further include any other type of information or data including, for example, metadata, state information, etc. Information and/or data may be communicated via the mesh through the core object to any device in the mesh. Also, the devices in the mesh may be heterogeneous, of any type, cooperative or collaborative with each other or with a mesh storage device or location, and/or distributed.

Any desired information may be included in a core object which may be projected from a storage location in the mesh to one or more devices cooperating in the mesh. A user may view any or all of the devices in the mesh via a view displayed at one or more device collaborating in the mesh. The view may include information on any of the data, applications, user interfaces, or other data or information associated with the user. Also, the core object or any information or data from the core object may be unassociated with any of the devices in the mesh. When a core object is unassociated with a device, the core object may not be stored locally on the device with which the core object is unassociated, for example. In this case, the core object may be projected to any device without being stored on the device receiving the projection of the core object. Hence, the core object may be stored remotely from the device such that the core object is stored at a location that is away from the device itself. In this way, any data file, application, user interface, etc. may be accessed and/or executed at a device in the mesh even when the data or information is not stored locally at the device. In another example, a portion of the core object may be stored locally while a portion of the core object may be stored remotely.

There are many examples of projecting a core object to a device in a mesh. In one example, the core object is stored remotely from at least one device associated with a user (i.e., not stored on the at least one device itself). Projection of the core object to the at least one device may include accessing a desired data file at the at least one device where the desired data file may be stored at a location other than locally at the at least one device itself. The data file may be activated or launched through execution of an application corresponding to the data file.

In one example, a device may receive an input from a user to access a desired data file. For example, a user interface may be displayed on a display of the device that provides a user with a list of data file selections. The user may select a desired data file from the list of data file selections on the display or user interface. An application program corresponding to the selected desired data file may not be located or stored locally at the device. If the application corresponding to the data file is not stored locally on the device, the location of the application or the storage location of the application may be determined. Based on the determined location of the application to launch the desired data file, the application may be launched or executed at the device even though the application is not stored at the device itself.

Also, the devices in the mesh may be in any configuration or network topology. The configuration of the devices in the mesh may be modified such that any of the devices may be moved from any location within the mesh to any other location within the mesh or may be removed from the mesh. Similarly, any device may be added to the mesh in any desired configuration or location. Hence, the devices in the mesh may be location-independent within the mesh.

Any of the devices in the mesh may include a mesh operating environment (MOE). The MOE may include executable code for providing a view of devices, data files, applications, or any desired information of interest in the mesh and also for providing services for facilitating connection of the device or other entity to the mesh. These services may include services for enabling participation of the device or other entity in the mesh, synchronizing the device/entity, user management, etc. Hence, the MOE may include any type of view or service associated with a device in the mesh or any data files or applications associated with the mesh. For example, a user may wish to access a data file on a collaborating device in a mesh. In one example, the data file and/or the application program corresponding to the data file may not be stored locally at the collaborating device. The data file may be presented to the user at the collaborating device via a view. The view may contain an interface with a unified depiction of the mesh which may include information on devices, data, applications, user interfaces, etc. in the mesh. In this example, presence of the data file may be provided in the view. If the data file is not stored locally at the collaborating device itself, an indication of the remote storage location of the data file may be provided in the view, if desired. For example, the data file may be displayed as an icon in which the icon contains an indication that the data file is not stored locally. In one example, the icon may be displayed in a ghosted form (e.g., "grayed out") to indicate that the data file is not stored locally. Alternatively, any indication may be used to indicate the data file is not stored locally.

In another example, the data file may be stored locally in which case the device may access a local memory store to obtain the desired data file. Also, the data file may be associated with a corresponding application, the execution of which may result in display of the data file. Also, execution of the corresponding application may provide certain predetermined functionality of the data file. If the data file and corresponding application are stored locally at the collaborating device and a selection is received by the system of the data file, the selected data file may be launched or executed by accessing a local memory store of the collaborating device and executing the corresponding application to open or activate the selected data file.

In another example, the data file and/or the corresponding application may not be stored locally at the collaborating device. For example, a user may be using the collaborating device in the mesh to access a desired data file. An application program corresponding to the desired data file may be used to open or activate the desired data file such that the desired data file may be viewed, modified, manipulated, or otherwise operated on. If the application corresponding to the desired data file is not stored locally at the collaborating device on which the user requests access to the desired data file, the collaborating device may contact a remote source to determine the location of the desired data file and/or the corresponding application of the desired data file.

The remote source for determining the location of the desired data, information, applications, etc. may be located at any desired location. For example, the remote source may be located at a location that is remote from the collaborating device or may be located remotely from any collaborating device in the mesh. In one example, the remote source includes a metadata store or cloud services, or designated storage device, for example, in which any desired data, applications, user interfaces, etc. may be stored or may be accessed by any collaborating device in the mesh.

In this example, the collaborating device in the mesh may contain an MOE that may contact a remote source for determining a location of a desired data file, application and/or user interface. The MOE may execute on the collaborating device to determine via the remote source a location of the desired information. The location of the desired information may be returned to the collaborating device from the remote source. Responsive to the received location information, the MOE of the collaborating device may execute to identify the device or storage location to retrieve the desired information or data. In one example, the desired information may be transmitted from the identified storage location and stored on the collaborating device.

A user may be associated with any number of devices or any type of devices in a mesh. For example, a user may use a corporate desktop computer, a home computer, a publicly shared computer, a laptop computer, a tablet PC, or a handheld computer or communication device, to name a few. Additionally, a user may wish to access data files or any other desired information or data from any of the devices.

Figure 2:
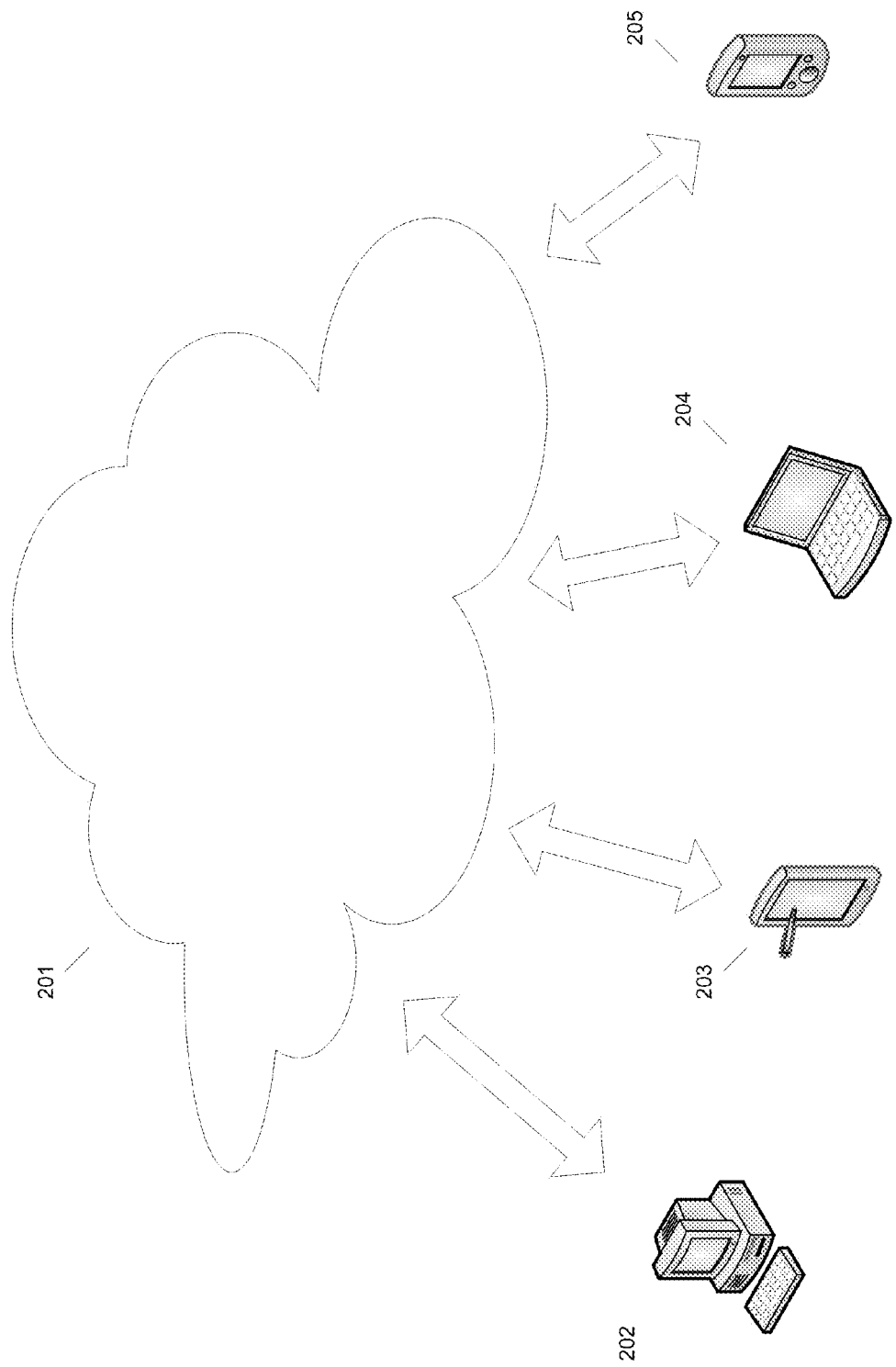
FIG. 2 illustrates an example of data access and storage.

Information relevant to the user may be stored remotely from the devices associated with the user. In addition, the relevant information may be associated with a user rather than a device corresponding to the user. For example, the data or information may be stored in a device, a cloud, or at any location. FIG. 2 illustrates one example in which data may be stored in a cloud 201. The information may further be projected to any number or type of devices that are associated with the user. In this example, the devices include a desktop computer 202, a tablet PC 203, a laptop computer 204 and a handheld computing device 205. Hence, any of the devices may receive information or data from a remote source in the cloud 201.

Figure 3:
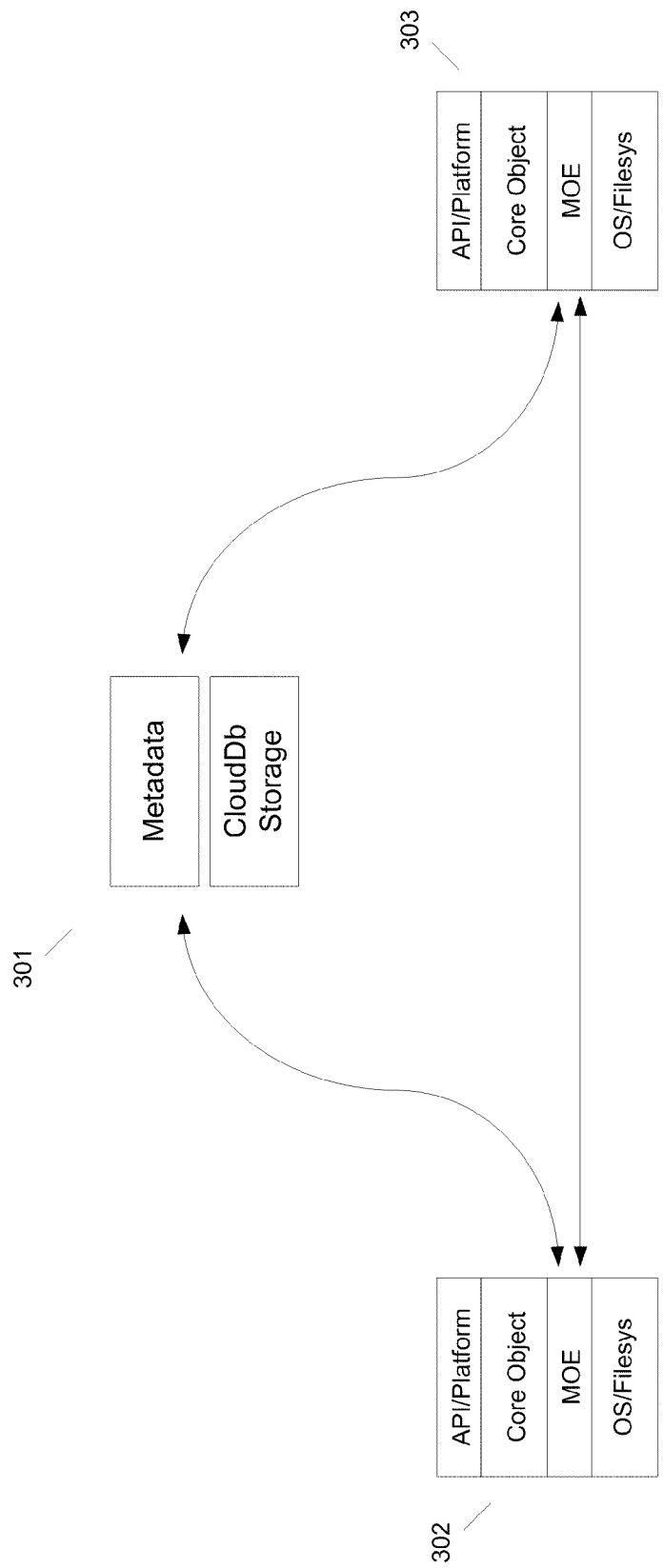
FIG. 3 illustrates another example of data access and storage.

FIG. 3 illustrates another example of data access and/or storage. In this example, a first computing device 302 and a second computing device 303 are in communication with a cloud database storage 301 in a mesh. FIG. 3 illustrates two computing devices, however, any number of computing devices may be included in the mesh. The cloud database storage 301 may further include a metadata store for describing or characterizing data pertaining to the user or for identifying identified data, applications, or other desired information. As FIG. 3 illustrates, any of the computing devices (e.g., the first computing device 302 and/or the second computing device 303) may contain an operating system and a mesh operating environment (MOE) in which the MOE may execute to provide a view and services of the mesh to the user on any of the computing devices.

In addition, any of the computing devices (e.g., first computing device 302 and/or second computing device 303) may include at least one core object. The core object may describe an experience with respect to data and information and may be moved over the mesh or accessed via the mesh. For example, the core object may include any desired data such as a data file, an application corresponding to the data file, and/or a user interface associated with the application and/or data file. As set forth above, the core object may also include any additional data or information such as, but not limited to, metadata or state information. A core object containing a data file, corresponding application for executing or activating the data file, and/or a user interface associated with the application or data file may be accessed by a computing device such as first computing device 302 where the core object being accessed is stored at a location that is remote from the location of the first computing device 302. For example, the core object being accessed may be stored at the second computing device 303 in this example. Alternatively or additionally, the core object may be stored at the cloud database storage 301.

The first computing device 302 may receive an input command, for example, from a user. The input command may include a selection of a desired data file. In one example, the first computing device 302 does not store the desired data file such that the desired data is not located locally at the first computing device 302. For example, the first computing device 302 may include a memory for storing data. However, the desired data file is not stored in the memory of the first computing device 302. In addition, the desired data file may have an associated application for executing, opening, or activating the desired data file. In another example, the memory of the first computing device 302 does not store the application. Hence, the memory of the first computing device 302 may lack the desired data file, the application associated with the desired data file, or both.

The first computing device 302 may further include a MOE for communicating with a remote source. Responsive to receiving the input command, the MOE of the first computing device 302 may execute to contact a remote storage location to determine a location of the desired data file and/or application associated with the desired data file. The remote storage location may include any type of data storage. For example, the remote storage location may be located remotely from the first computing device 302 and may store identifier information for identifying devices in the mesh and/or storage locations of data, applications, metadata, or any other relevant data or information in the mesh. Additionally or alternatively, the remote storage location may also store relevant data or information locally at the remote storage location. In another example, a peer-to-peer arrangement or a collaborative arrangement may be used. For example, the MOE of the first computing device 302 may execute to contact at least one other peer device in the network. The at least one peer device may provide identifier information or other mesh information. Any number of devices in the mesh may be used for providing the information.

The MOE in the first computing device 302 may contact the metadata store of the cloud database storage 301 to determine a storage location of the desired information. In one example, the metadata store of the cloud database storage 301 may locate the desired data file and/or application at the second computing device 303 and send an instruction to the first computing device 302 indicating the location of the second computing device 303 as containing the desired information. Responsive to the instruction from the cloud database storage 301, the first computing device 302 may execute the corresponding MOE or execute a service containing the MOE to contact the second computing device 303 to receive the desired data, information, application, etc. The requested information may then be communicated or projected from the second computing device 303 to the first computing device 301. Hence, in this example, the selected data file may be opened or activated on the first computing device 302 even if the data file, application corresponding to the data file, and/or the user interface associated with the application or data file is/are not stored locally at the first computing device 302.

Also in this example, the data file, application, user interface, or other information from the second computing device 303 may be modified, logged, or otherwise manipulated on at the first computing device 302 via any action or event taken at the first computing device 302. The events or actions taken at the first computing device 302 pertaining to the data, information, application, etc. projected from the second computing device 303 may be monitored or updated at the second computing device 303. Hence, data, applications, etc. at a first computing device 302 that are altered or updated may be synchronized with the corresponding data or information at the second computing device 302.

Figure 4:
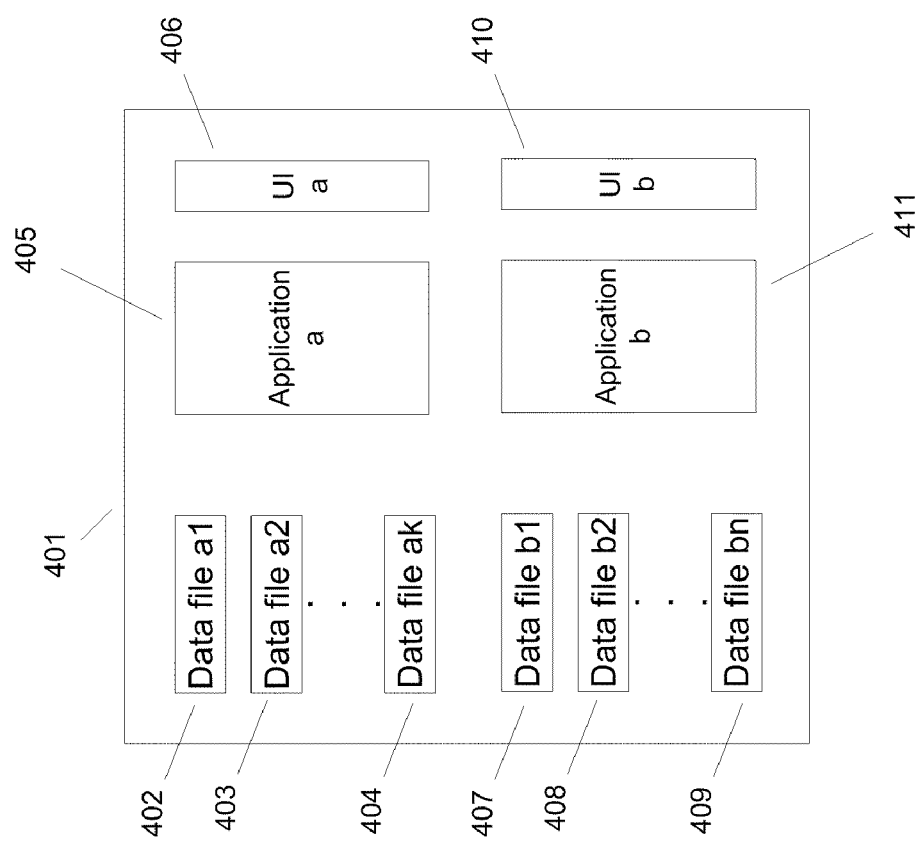
FIG. 4 illustrates one example of a core object.

FIG. 4 illustrates one example of a core object. FIG. 4 is merely one example as the core object may contain any additional elements as desired. For example, the core object may further include state information or metadata. In this example, a core object 401 may include any number of data files, any number of applications and any number of user interfaces (UI). As FIG. 4 illustrates, the core object 401 may include k data files (data files a1 402, data file a2 403, data file ak 404) corresponding to application a 405. For example, any of data files 402-404 may be opened, activated, launched, or displayed by executing the corresponding application a 405. Also, data in the data file may be provided in a user interface 406 corresponding to the application a 405 and the corresponding data file. Any number of data files, applications and user interfaces may be included in the core object. As FIG. 4 illustrates, the core object 401 further includes a second set of data files (data file b1 407, data file b2 408, data file bn 409), corresponding application b 411, and corresponding user interface b 410. Hence, any of data files 407-409 may be opened, activated, launched or otherwise activated by corresponding application 411.

The core object, such as the core object 401 illustrated in FIG. 4, may be accessed over a mesh between any number of collaborating devices in the mesh. For example, one device in the mesh may access the core object at a remote location. Information in the core object may be projected from the remote location or remote device to the mesh device. In addition, a view may be projected to the mesh device for displaying mesh information. For example, the view may be displayed on a display of a mesh device containing a view of the mesh, devices of the mesh, and files or applications stored at remote locations from the mesh device.

Figure 5:
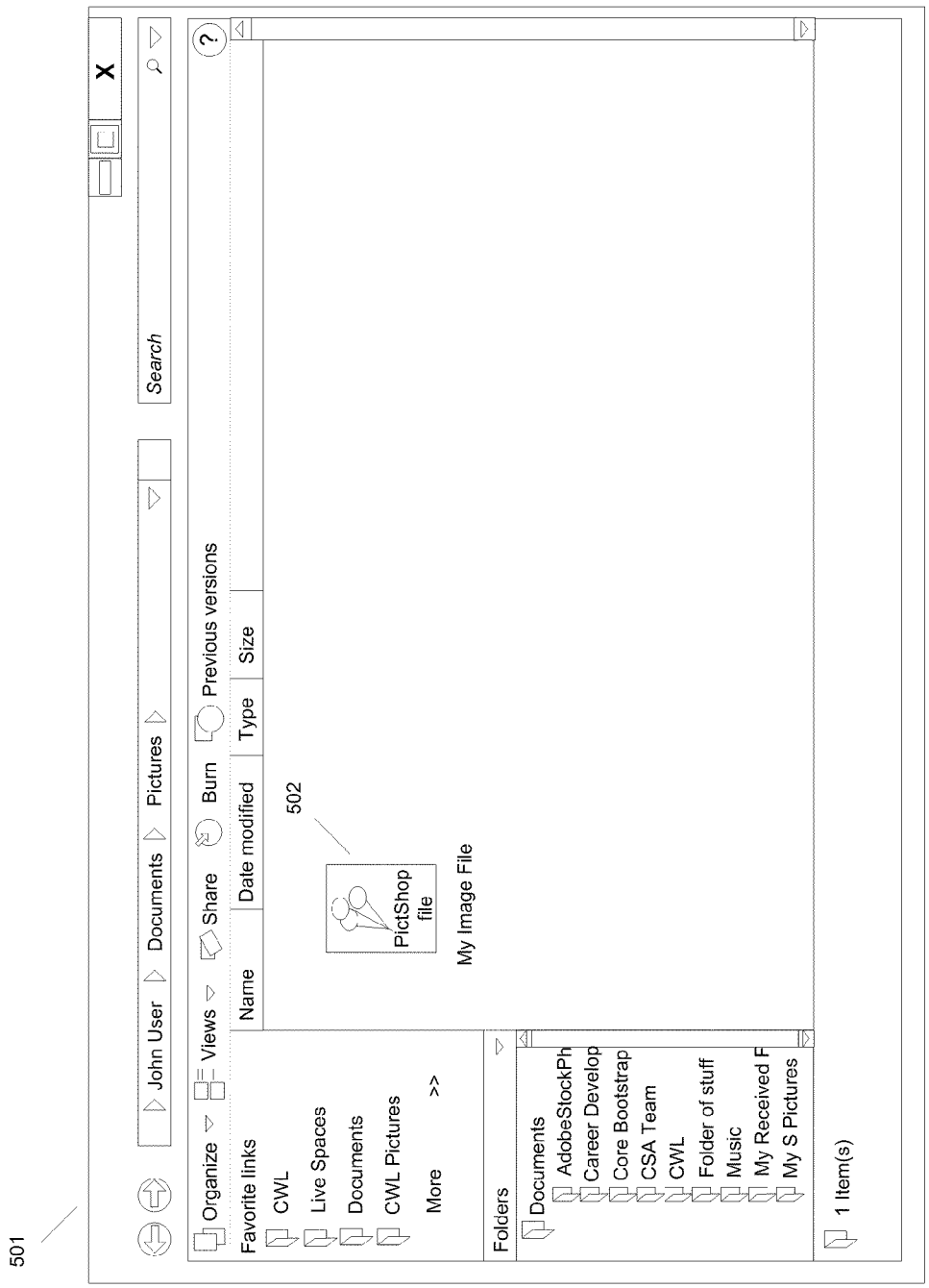
FIG. 5 illustrates an example of a user interface displayed on a collaborating device in a mesh.

FIG. 5 illustrates an example of a user interface displayed on a collaborating device in a mesh. In this example, the collaborating device may display a user interface 501 containing a graphic representing a data file. In this case, the graphic is an icon or thumbnail 502 corresponding to an image file of a certain application (in this example, an image file that is a "PictShop" application file entitled "My Image File"). The image file represented by icon 502 may be associated with a particular user. Also, the image file may not be associated with a computing device that displays the image file icon 502. Because the image file in this example is associated with the user rather than a particular computing device, the user may use any computing device to access the image file. For example, a user may use a first computing device to access the image file by launching a corresponding application. The user may subsequently move to a second computing device in which the second computing device does not contain the application corresponding to the image file. In this example, even though the second computing device does not contain the application corresponding to the image file, the user may still use the second computing device to access or open the image file because the data is associated with the user rather than with the computing devices themselves. Thus, a user to whom the image file is associated may use any collaborating device in the mesh to access the image file even if the image file is not stored on the collaborating device being used.

Figure 6:
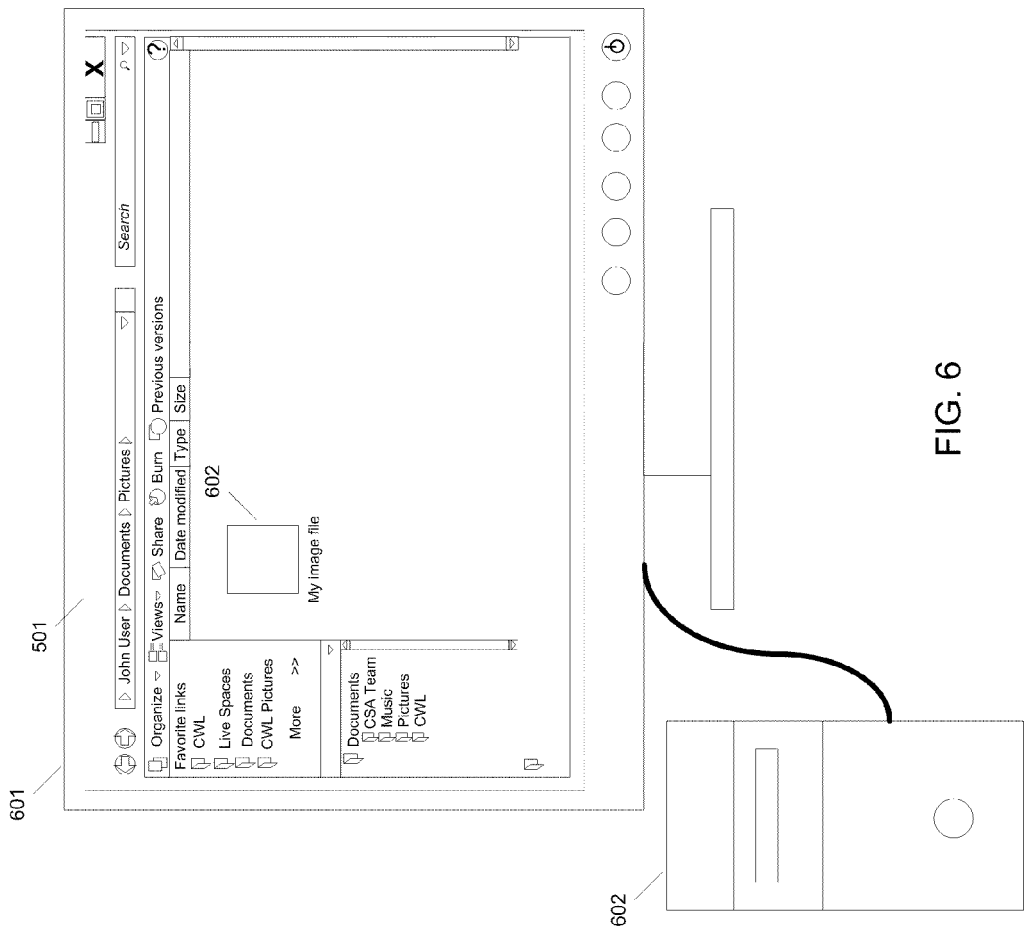
FIG. 6 illustrates an example of a computing device.

In one example, the image file represented by icon 502 is not stored locally on the device being used to access the image file. FIG. 6 illustrates an example of a computing device 602 in connection with a display device 601. The display device 601 displays a window or user interface 501 containing information of available data files. In this case, an icon 502 corresponding to "My Image File" is displayed in the user interface 501 on the display device 601. Also in this example, the data or image file corresponding to the icon 502 is not stored locally on the computing device (e.g., not stored in memory of computing device 602). Rather, the image file may be stored remotely from the computing device and may be projected to the computing device to be provided to the user.

Figure 7:
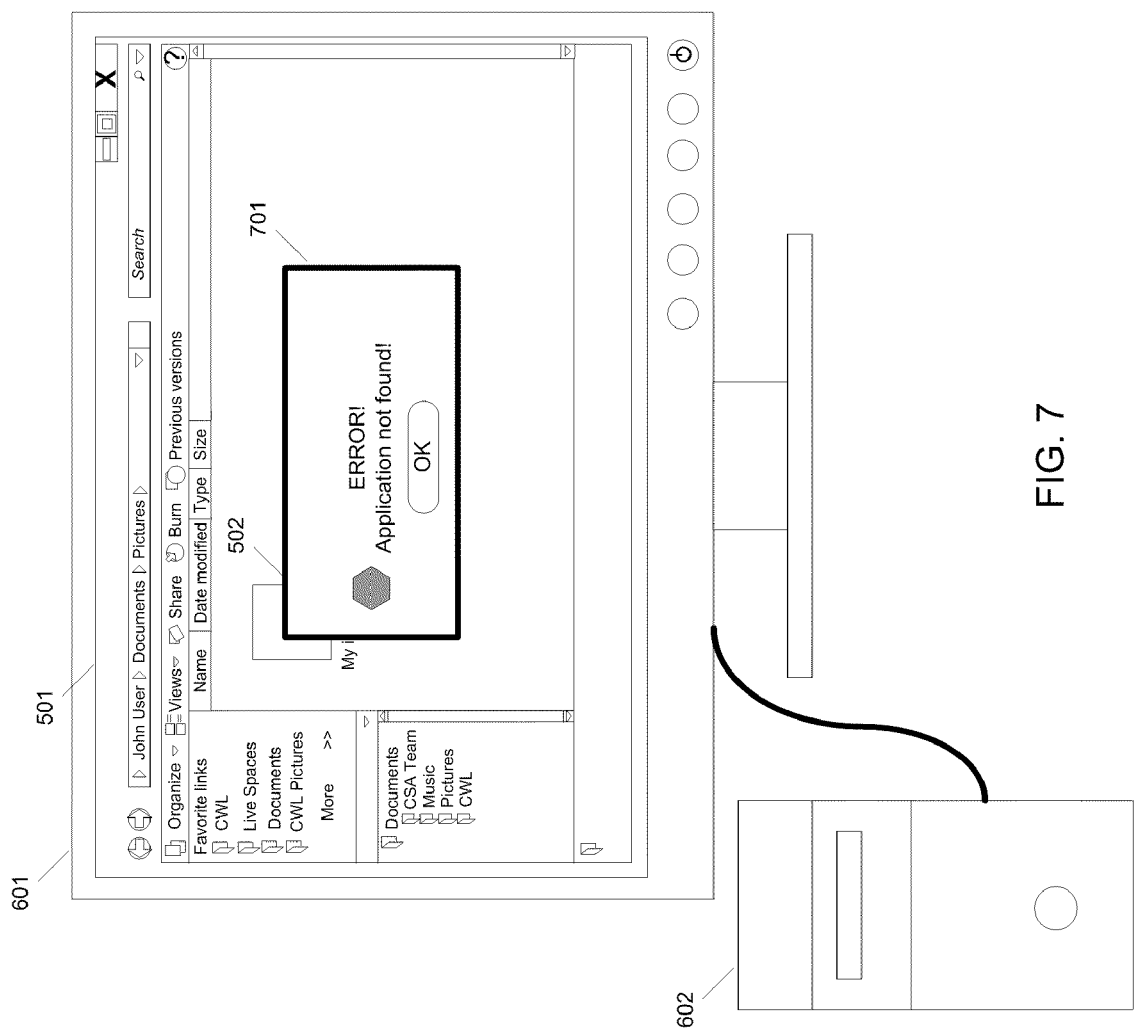
FIG. 7 illustrates an example of a typical message when an application application program corresponding to the data file is not stored locally at the device.

FIG. 7 illustrates an example of a typical message provided when access from a device to a data file at the device is attempted when an application program corresponding to the data file is not stored locally at the device. In this case, a computing device 602 containing a memory (not shown) is connected to a display device 601 the displays a user interface 501 containing an icon 502 corresponding to a data file. However, an application program corresponding to the data file is not stored locally in memory of the computing device 602. A selection of the icon 502 is received via the user interface or window 501 displayed on the display device 601. Because the corresponding application program is not stored locally in memory of the computing device 602, an error message 701 is displayed indicating that the application is not found. Hence, access to the data file is not accomplished in this example.

Figure 8:
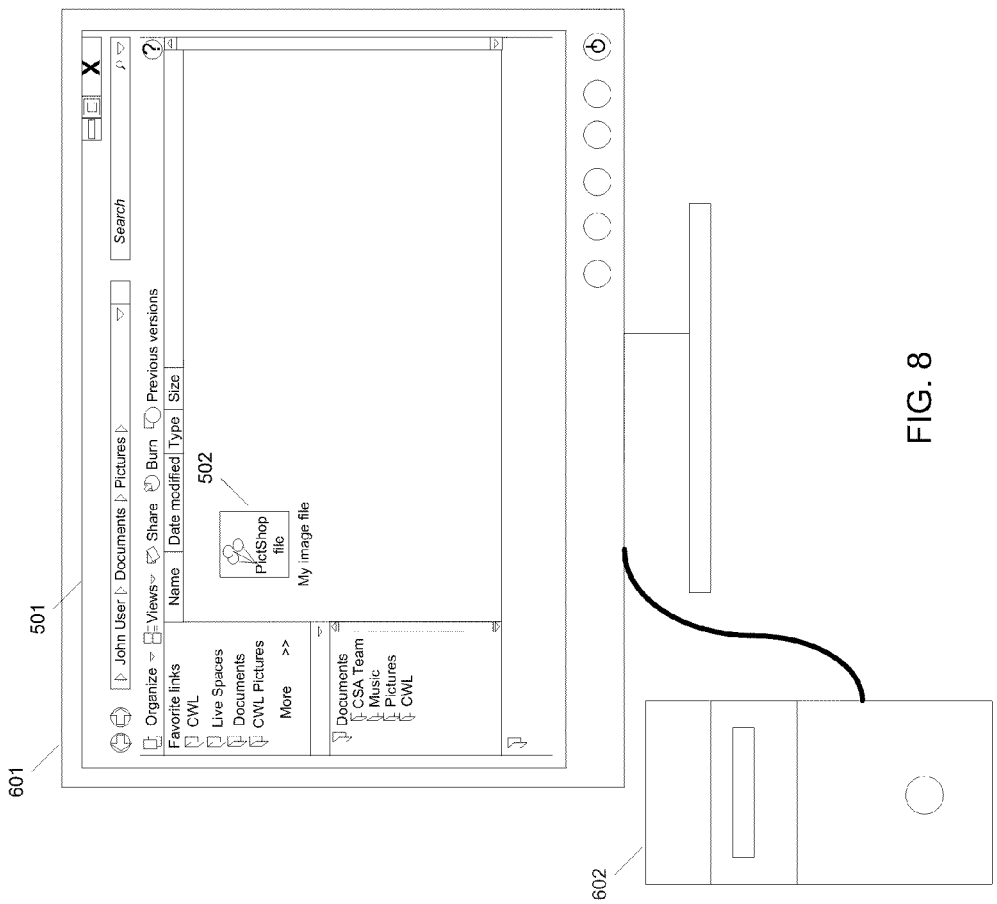
FIG. 8 illustrates an example of accessing a data file on a collaborating device in a mesh.

FIG. 8 illustrates an example of accessing a data file on a collaborating device in a mesh. In this example, a data file and/or an application program corresponding to the data file is not stored locally at the device. As FIG. 8 illustrates, a device may include a computing device 602 which may also include a memory for storing information or data used by the computing device 602. The computing device 602 may also be connected to a display device 601 for displaying information relevant to the user. For example, the display device 601 may display a window or user interface 501 which may further include an icon 502 representing a data file of interest (in this example, the data file of interest includes an image file).

The data file represented by icon 502 and/or the application program that permits launching, accessing, or activating of the data file may not be stored locally in memory of the computing device 602. Thus, the information and data (i.e., data file and/or application program corresponding to the data file) is not associated, owned, or controlled by the computing device 602. Rather, the information and data is associated, owned, or controlled by the user instead of the any device associated with the user.

Figure 9:
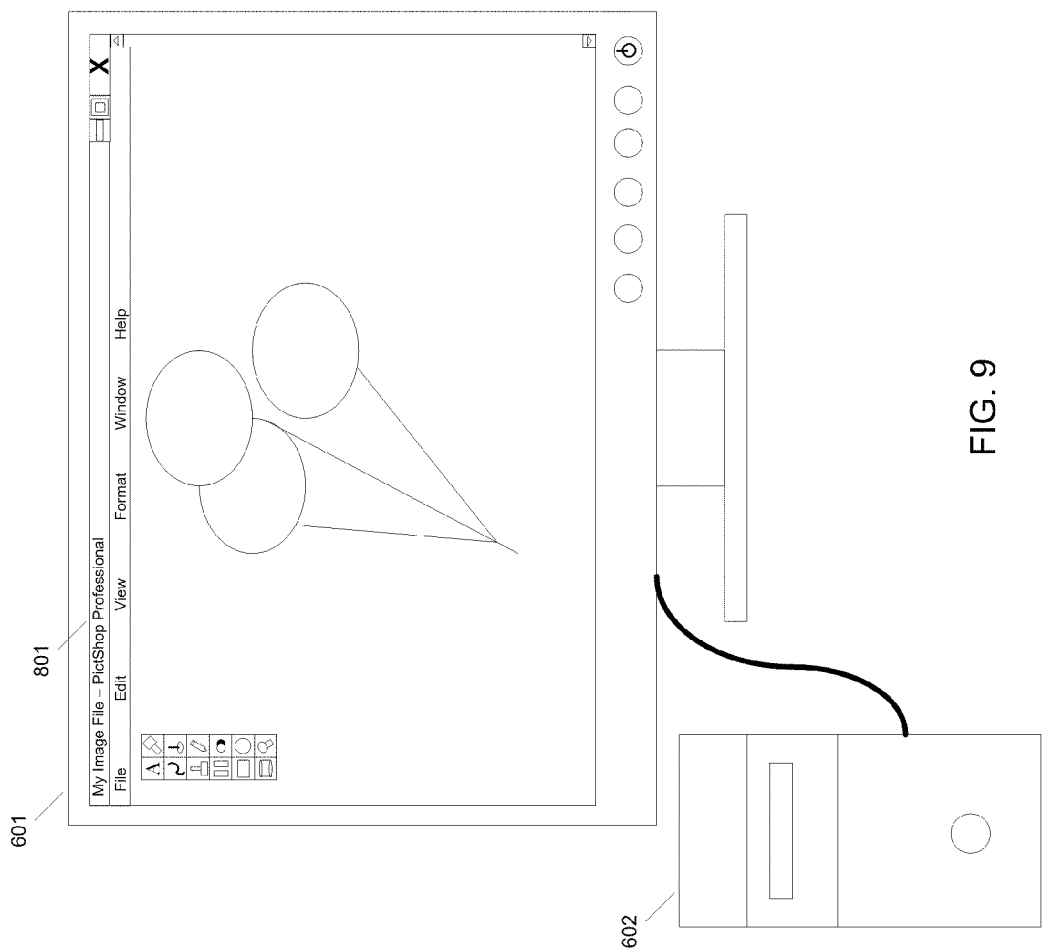
FIG. 9 illustrates an example of activation of a data file via launching of a corresponding application program.

FIG. 9 illustrates an example of activation of a data file via launching of a corresponding application program when the data file and/or corresponding application program is not owned or controlled by the device on which the data file is activated or opened. In this example, a computing device 602 is connected to a display device 601. Activation of an icon (such as icon 502) representing a desired data file may be selected. In this example, the application program corresponding to the data file is not stored at the computing device 602. Rather, the application program may be stored at a remote location but may also be associated with a particular user. The user may thus use the computing device 602 to access the application program (and/or data file corresponding to the application program) while the application program is located remotely from the device itself.

As FIG. 9 illustrates, the "PictShop" image file is launched and activated on the computing device 602 and a corresponding user interface or window 801 is displayed. The user may thus access the data file and the application program launching and may obtain a corresponding user interface for the data file even if any or all of the components are not owned or controlled by the device on which the user is accessing the information.

Figure 10:
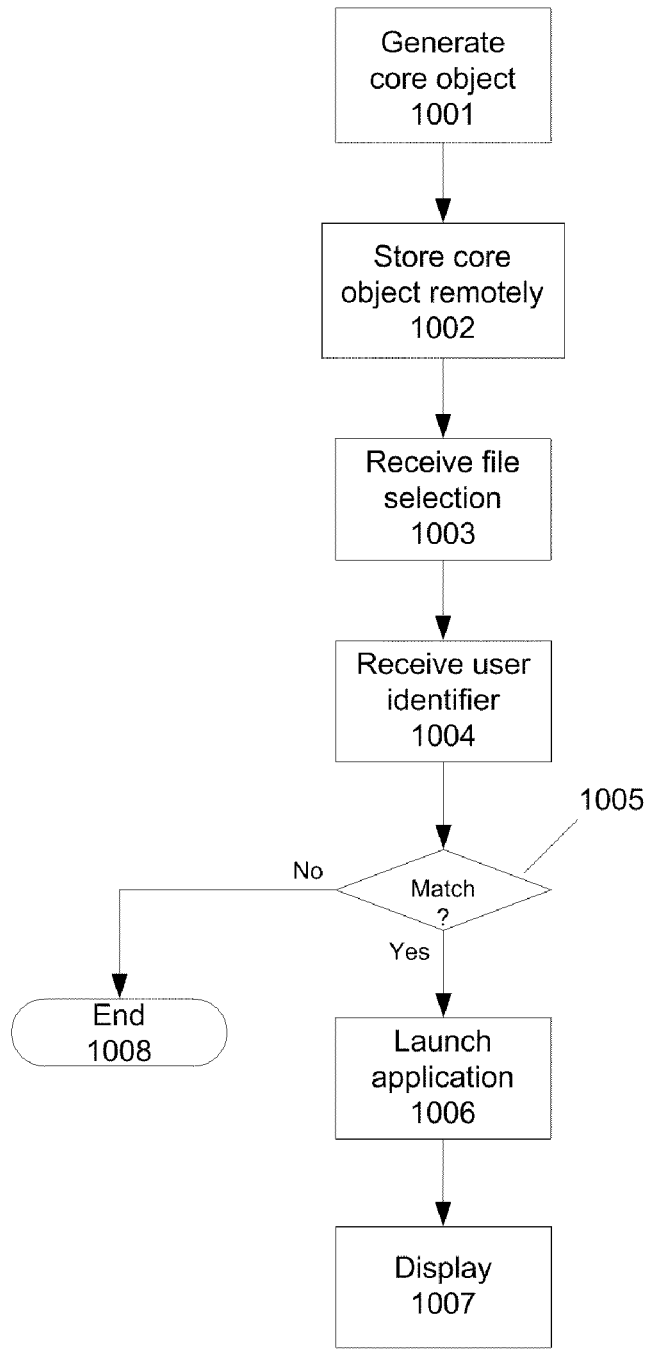
FIG. 10 is a flowchart illustrating an example of a method of accessing desired information.

FIG. 10 is a flowchart illustrating an example of a method of accessing desired information. A core object is generated in STEP 1001. In one example of a core object, the core object contains a data file, an application program corresponding to the data file, and a user interface corresponding to the data file and corresponding application program. The core object is associated with a corresponding user rather than being associated with a particular device. Thus, a user may access the core object independently of the device being used by the user.

In STEP 1002, the core object is stored remotely from a user device. For example, a user may have a home computer. A core object is created containing data files of interest, application programs for the data files and user interfaces (STEP 1001). This core object in this example is not stored on the user's home computer. Rather, the core object may be stored at an alternate location. However, the core object is associated with the user such that the user may still access the core object and the information contained therein from the home computer (or any other device utilized by the user).

In this example, the user is using the home computer and may select a desired data file at the home computer (STEP 1003). In addition, the user may input an identifier that identifies the user (STEP 1004). In another example, the identifier may be associated with the computer or device and may be provided automatically. The home computer may be a collaborating device in a mesh and may include a mesh operating environment (MOE) that may execute to contact a remote source in the mesh. The remote source may compare the user identifier received from the home computer and the requested data file or application to determine a match (STEP 1005). If a match is identified, the requested data file, application, and user interfaces may be provided to the user's home computer. For example, the core object may be provided to the home computer from a storage location within the mesh. The application corresponding to the requested data file may be launched (STEP 1006) to provide the requested data in a corresponding user interface. Hence, the requested data file may be displayed for the user (STEP 1007).

It is understood that aspects of the present description can take many forms and embodiments. The embodiments shown herein are intended to illustrate rather than to limit the description, it being appreciated that variations may be made without departing from the spirit of the scope of the invention. Although illustrative embodiments have been shown and described, a wide range of modification, change and substitution is intended in the foregoing disclosure and in some instances some features may be employed without a corresponding use of the other features. Accordingly, it is appropriate that the appended claims be construed broadly and in a manner consistent with the scope of the invention.

The invention claimed is:

1. A method comprising:
  receiving, at any computing device of a plurality of computing devices that are each configured to be utilized by a user who is common to each of the plurality of computing devices, a request from the user to access a core object of one or more core objects, wherein each of the one or more core objects is owned by the user and not owned by any of the plurality of computing devices, and wherein the plurality of computing devices form a mesh that is coupled to cloud storage, and wherein each of the one or more core objects is stored on any of a plurality of storage locations that includes the cloud storage and each of the plurality of computing devices;
  determining a storage location of the plurality of storage locations on which the core object is stored, wherein the storage location is not the any computing device;
  receiving, in response to the received request and the determining, a projection of the core object from the determined storage location; and
  accessing, by the user via the any computing device, the projected core object from the determined storage location, where the accessing comprises executing, by the any computing device, an application portion of the core object.

2. The method of claim 1, wherein the core object comprises a data file and an application corresponding to the data file and a user interface corresponding to the application.

3. The method of claim 1, wherein the determining is performed by a mesh operating environment of the any computing device.

4. The method of claim 3, wherein the mesh operating environment is configured to perform the determining at least by contacting each of the plurality of storage locations.

5. The method of claim 1, wherein a portion of the core object is stored on the any computing device.

6. At least one computer storage device storing instructions that, when executed by a computing device, cause the computing device to perform a method comprising:
  receiving, at any computing device of a plurality of computing devices that are each configured to be utilized by a user who is common to each of the plurality of computing devices, a request from the user to access a core object of one or more core objects, wherein each of the one or more core objects is owned by the user and not owned by any of the plurality of computing devices, and wherein the plurality of computing devices form a mesh that is coupled to cloud storage, and wherein each of the one or more core objects is stored on any of a plurality of storage locations that includes the cloud storage and each of the plurality of computing devices;
  determining a storage location of the plurality of storage locations on which the core object is stored, wherein the storage location is not the any computing device;
  receiving, in response to the received request and the determining, a projection of the core object from the determined storage location; and
  accessing, by the user via the any computing device, the core object from the determined storage location, where the accessing comprises executing, by the any computing device, an application portion of the core object.

7. The at least one computer storage device of claim 6, wherein the core object comprises a data file and an application corresponding to the data file and a user interface corresponding to the application.

8. The at least one computer storage device of claim 6, wherein the determining is performed by a mesh operating environment of the any computing device.

9. The at least one computer storage device of claim 8, wherein the mesh operating environment is configured to perform the determining at least by contacting each of the plurality of storage locations.

10. The at least one computer storage device of claim 6, wherein a portion of the core object is stored on the any computing device.

11. A system comprising:
  an input device configured for receiving, at any computing device of a plurality of computing devices that are each configured to be utilized by a user who is common to each of the plurality of computing devices, a request from the user to access a core object of one or more core objects, wherein each of the one or more core objects is owned by the user and not owned by any of the plurality of computing devices, and wherein the plurality of computing devices form a mesh that is coupled to cloud storage, and wherein each of the one or more core objects is stored on any of a plurality of storage locations that includes the cloud storage and each of the plurality of computing devices, and wherein the system is the any computing device;

a processor configured for determining a storage location of the plurality of storage locations on which the core object is stored, wherein the storage location is not the any computing device;

an adapter configured for receiving, in response to the received request and the determining, a projection of the core object from the determined storage location; and the processor further configured for accessing, by the user via the any computing device, the core object from the determined storage location, where the accessing comprises executing, by the any computing device, an application portion of the core object.

12. The system of claim 11, wherein the core object comprises a data file and an application corresponding to the data file and a user interface corresponding to the application.

13. The system of claim 11, wherein the processor is configured by a mesh operating environment of the any computing device for the determining the storage location.

14. The system of claim 11, wherein the determining includes at least contacting each of the plurality of storage locations.

15. The system of claim 11, wherein a portion of the core object is stored on the any computing device.

16. The system of claim 11, the input device further configured to receive an identifier that identifies the user.

17. The system of claim 11, the processor further configured to determine a match between the core object and the identifier, wherein the match indicates that the user owns the core object.

* * * * *